(12) United States Patent
Li et al.

(10) Patent No.: US 12,506,850 B2
(45) Date of Patent: Dec. 23, 2025

(54) FUSION TECHNIQUES FOR COMBINING MOST SIGNIFICANT BITS AND LEAST SIGNIFICANT BITS OF IMAGE DATA IN IMAGE PROCESSING OR OTHER APPLICATIONS

(71) Applicant: Samsung Electronics Co., Ltd., Suwon-si (KR)

(72) Inventors: Wenbo Li, Santa Clara, CA (US); Zhipeng Mo, Coquitlam (CA); Yi Wei, Sunnyvale, CA (US); Burak Uzkent, Mountain View, CA (US); Qian Lou, Oviedo, FL (US); Yilin Shen, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 18/057,126

(22) Filed: Nov. 18, 2022

(65) Prior Publication Data

US 2024/0080423 A1 Mar. 7, 2024

Related U.S. Application Data

(60) Provisional application No. 63/403,468, filed on Sep. 2, 2022.

(51) Int. Cl.
*H04N 9/64* (2023.01)
(52) U.S. Cl.
CPC ................................. *H04N 9/64* (2013.01)

(58) Field of Classification Search
CPC ........ H04N 9/64; G06N 3/0464; G06V 10/82; G09G 5/026
See application file for complete search history.

(56) References Cited

U.S. PATENT DOCUMENTS

| 9,332,239 B2 | 5/2016 | Cote et al. |
| 11,080,611 B2 | 8/2021 | Singh et al. |
| 2018/0189981 A1* | 7/2018 | Singh ...................... G06F 13/10 |

(Continued)

FOREIGN PATENT DOCUMENTS

WO 2022163130 A1 8/2022

OTHER PUBLICATIONS

Schwartz et al., "DeepISP: Learning End-to-End Image Processing Pipeline," IEEE Transactions on Image Processing, Jan. 2018, 8 pages.

(Continued)

*Primary Examiner* — John R Wallace

(57) ABSTRACT

A method includes obtaining raw image data, where the raw image data includes data values each having most significant bits and least significant bits. The method also includes providing the raw image data to a trained machine learning model and generating processed image data using the trained machine learning model. The method further includes presenting an image based on the processed image data. The trained machine learning model is trained to modulate a feature map associated with the most significant bits of the data values of the raw image data based on the least significant bits of the data values of the raw image data in order to generate a fusion of the most significant bits and the least significant bits of the data values of the raw image data.

20 Claims, 6 Drawing Sheets

(56) References Cited

U.S. PATENT DOCUMENTS

| | | | |
|---|---|---|---|
| 2019/0171930 A1 | 6/2019 | Lee et al. | |
| 2019/0362155 A1 | 11/2019 | Croxford | |
| 2020/0097792 A1 | 3/2020 | Chen et al. | |
| 2020/0104978 A1* | 4/2020 | Kalchbrenner | G06T 11/00 |
| 2020/0160161 A1 | 5/2020 | Yoo et al. | |
| 2020/0351460 A1* | 11/2020 | Cote | H04N 1/60 |
| 2020/0410643 A1 | 12/2020 | Kalchbrenner et al. | |
| 2021/0027142 A1* | 1/2021 | Kim | G06N 3/082 |
| 2021/0089906 A1 | 3/2021 | Lazovich | |
| 2021/0166434 A1 | 6/2021 | Miyauchi | |
| 2022/0012903 A1 | 1/2022 | Vyas et al. | |
| 2022/0101494 A1 | 3/2022 | Mardani Korani et al. | |
| 2022/0116628 A1 | 4/2022 | Satavalekar et al. | |
| 2022/0189029 A1 | 6/2022 | Mequanint et al. | |
| 2024/0078803 A1 | 3/2024 | Aoki et al. | |

OTHER PUBLICATIONS

Sharif et al., "SAGAN: Adversarial Spatial-asymmetric Attention for Noisy Nona-Bayer Reconstruction," https://arxiv.org/abs/2110.08619, Oct. 2021, 13 pages.

Sharif et al., "Beyond Joint Demosaicking and Denoising: An Image Processing Pipeline for a Pixel-bin Image Sensor," 2021 IEEE/CVF Conference on Computer Vision and Pattern Recognition Workshops, 2021, 10 pages.

Ignatov et al., "Replacing Mobile Camera ISP with a Single Deep Learning Model," Proceedings of the IEEE/CVF Conference on Computer Vision and Pattern Recognition Workshops, 2020, 11 pages.

Xiao et al., "FPS-Net: A Convolutional Fusion Network for Large-Scale LiDAR Point Cloud Segmentation," ISPRS Journal of Photogrammetry and Remote Sensing, vol. 176, 2021, 24 pages.

Cadena et al., "SPADE-E2VID: Spatially-Adaptive Denormalization for Event-Based Video Reconstruction," IEEE Transactions on Image Processing, Jan. 2021, 14 pages.

International Search Report and Written Opinion of the International Searching Authority dated Jun. 29, 2023 in connection with International Patent Application No. PCT/KR2023/003637, 10 pages.

Sharma et al., "Bit Fusion: Bit-Level Dynamically Composable Architecture for Accelerating Deep Neural Network," IEEE 45th Annual International Symposium on Computer Architecture, Jun. 2018, 13 pages.

Supplementary European Search Report dated Aug. 26, 2025 in connection with European Patent Application No. 23860575.2, 9 pages.

Al-Dmour, "Enhancing Information Hiding and Segmentation for Medical Images using Novel Steganography and Clustering Fusion Techniques," PhD Dissertation, University of Technology Sydney, Jan. 2018, 245 pages.

Punnappurath et al., "A Little Bit More: Bitplane-Wise Bit-Depth Recovery," IEEE Transaction on Pattern Analysis and Machine Intelligence, vol. 44, No. 12, Nov. 2021, 7 pages.

Ruan et al., "Deep learning for real-time image steganalysis: a survey," Journal of Real-Time Image Processing 17(2), Feb. 2020, 12 pages.

Venkata et al., "Artificial Neural Network Based Technique for Hiding Image into Video using DWT-LSB, MSB for Cloud Environment," International Journal for Modern Trends in Science and Technology, 8(05), Jul. 2022, 8 pages.

* cited by examiner

FUSION TECHNIQUES FOR COMBINING MOST SIGNIFICANT BITS AND LEAST SIGNIFICANT BITS OF IMAGE DATA IN IMAGE PROCESSING OR OTHER APPLICATIONS

CROSS-REFERENCE TO RELATED APPLICATION AND PRIORITY CLAIM

This application claims priority under 35 U.S.C. § 119(e) to U.S. Provisional Patent Application No. 63/403,468 filed on Sep. 2, 2022. This provisional application is hereby incorporated by reference in its entirety.

TECHNICAL FIELD

This disclosure relates generally to imaging systems. More specifically, this disclosure relates to fusion techniques for combining most significant bits and least significant bits of image data in image processing or other applications.

BACKGROUND

Digital cameras in mobile electronic devices (such as smartphones and tablet computers) continue to increase in capabilities over time. Among other things, the resolution of images captured using digital cameras in mobile electronic devices continues to increase at a rapid pace. It is expected that digital cameras in mobile electronic devices will soon be able to generate images having hundreds of megapixels or more of image data. Not only do these images need to be stored in memory, these images also typically need to be converted from a raw image data format to a different image data format (such as in the red-green-blue or "RGB" image color space) for display to users. The conversion process typically involves using additional memory space in order to process and convert the raw image data. As a result, capturing, processing, and storing images having ever-increasing resolutions can be time-consuming and require large amounts of processing and memory resources.

SUMMARY

This disclosure relates to fusion techniques for combining most significant bits and least significant bits of image data in image processing or other applications.

In a first embodiment, a method includes obtaining raw image data, where the raw image data includes data values each having most significant bits and least significant bits. The method also includes providing the raw image data to a trained machine learning model and generating processed image data using the trained machine learning model. The method further includes presenting an image based on the processed image data. The trained machine learning model is trained to modulate a feature map associated with the most significant bits of the data values of the raw image data based on the least significant bits of the data values of the raw image data in order to generate a fusion of the most significant bits and the least significant bits of the data values of the raw image data.

In a second embodiment, an apparatus includes at least one imaging sensor and at least one processing device. The at least one processing device is configured to obtain raw image data using the at least one imaging sensor, where the raw image data includes data values each having most significant bits and least significant bits. The at least one processing device is also configured to provide the raw image data to a trained machine learning model and generate processed image data using the trained machine learning model. The at least one processing device is further configured to initiate presentation of an image based on the processed image data. The trained machine learning model is trained to modulate a feature map associated with the most significant bits of the data values of the raw image data based on the least significant bits of the data values of the raw image data in order to generate a fusion of the most significant bits and the least significant bits of the data values of the raw image data.

In a third embodiment, a non-transitory machine readable medium contains instructions that when executed cause at least one processor to obtain raw image data, where the raw image data includes data values each having most significant bits and least significant bits. The non-transitory machine readable medium also contains instructions that when executed cause the at least one processor to provide the raw image data to a trained machine learning model and generate processed image data using the trained machine learning model. The non-transitory machine readable medium further contains instructions that when executed cause the at least one processor to initiate presentation of an image based on the processed image data. The trained machine learning model is trained to modulate a feature map associated with the most significant bits of the data values of the raw image data based on the least significant bits of the data values of the raw image data in order to generate a fusion of the most significant bits and the least significant bits of the data values of the raw image data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
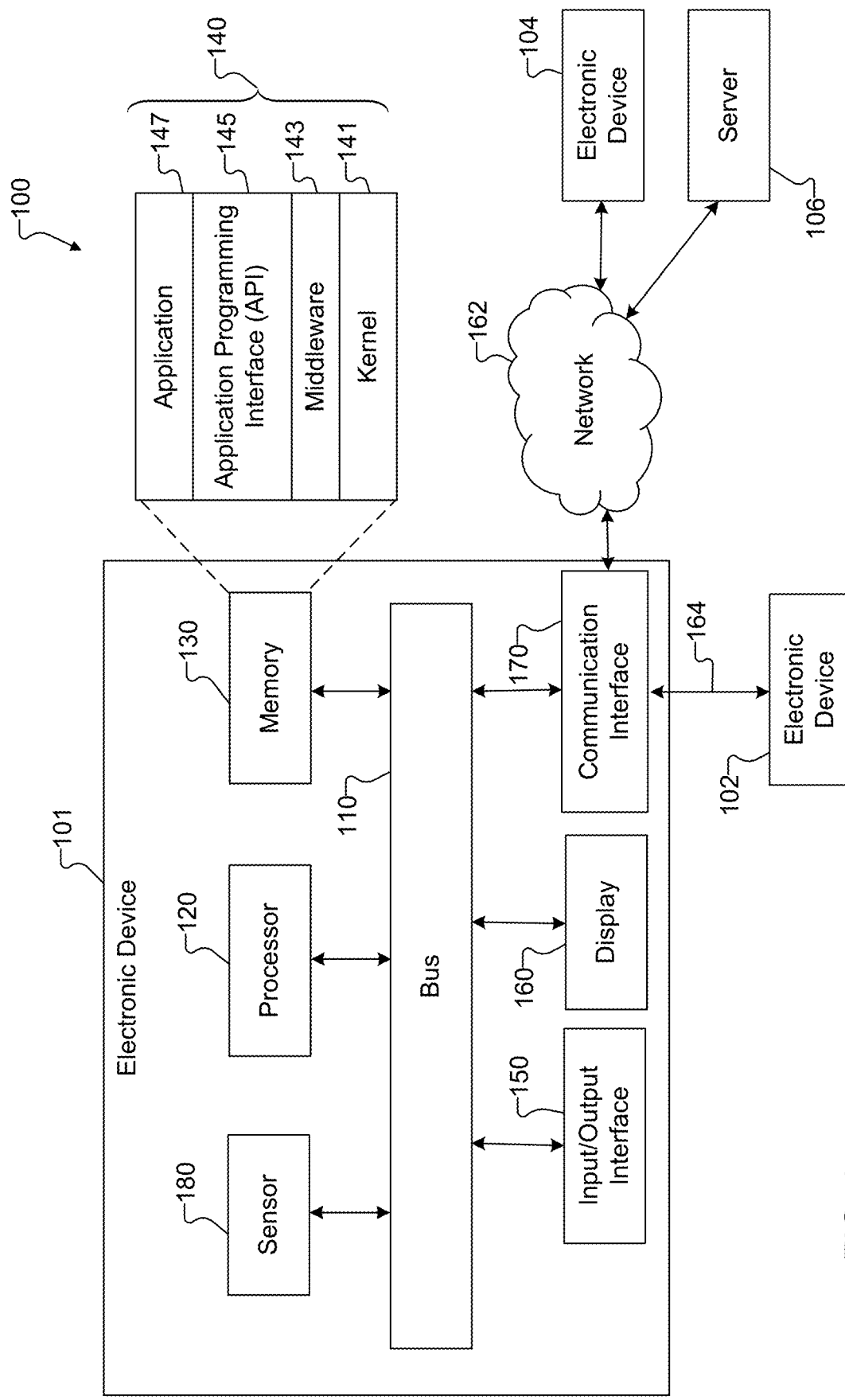
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, digital cameras in mobile electronic devices (such as smartphones and tablet computers) continue to increase in capabilities over time. Among other things, the resolution of images captured using digital cameras in mobile electronic devices continues to increase at a rapid pace. It is expected that digital cameras in mobile electronic devices will soon be able to generate images having hundreds of megapixels or more of image data. Not only do these images need to be stored in memory, these images also typically need to be converted from a raw image data format to a different image data format (such as in the red-green-blue or "RGB" image color space) for display to users. The conversion process typically involves using additional memory space in order to process and convert the raw image data. As a result, capturing, processing, and storing images having ever-increasing resolutions can be time-consuming and require large amounts of processing and memory resources.

In one approach, raw image data values can be unpacked by expanding the number of bits of each data value in an image from ten bits to sixteen bits. The image is then split into smaller tiles for parallel processing, and the processed tiles are subsequently combined to produce a processed image. However, unpacking the raw data values in an image can require significant processing time and memory resources. Also, processing the individual tiles using structures such as a UNET model may not produce high-quality RGB images. In addition, machine learning-based approaches can suffer from slow processing times and large memory requirements when processing high-resolution image data.

This disclosure provides fusion techniques for combining most significant bits and least significant bits of image data in image processing or other applications. As described in more detail below, raw image data can be obtained, where the raw image data includes data values. Each data value includes most significant bits and least significant bits, such as when each data value includes eight most significant bits and two least significant bits. The raw image data is provided to a trained machine learning model, and processed image data is generated using the trained machine learning model. The trained machine learning model is trained to modulate at least one feature map associated with the most significant bits of the data values based on the least significant bits of the data values. This produces a fusion of the most significant bits and the least significant bits of the data values, allowing the raw image data to be converted into a different format (such as when converted into RGB data). An image based on the processed image data can be presented, such as on a display of a user's mobile device, or otherwise used in any suitable manner.

In this way, high-resolution raw image data containing very large numbers of data values can be quickly converted into another format for display or other use. The trained machine learning model that is used here can represent a lightweight machine learning model, which allows the trained machine learning model to be used in faster times and using fewer processing and memory resources. For instance, the trained machine learning model can be used without unpacking data values to include additional bits, which can save significant processing and memory resources. The trained machine learning model can also be used to generate high-quality RGB images or other high-quality images based on the raw image data. Among other reasons, this is because the most significant bits of the data values in the raw image data may contain many or most of the visual features in an image and can be used to determine one or more feature maps of the image. Since the most significant bits of the data values in the raw image data may lack fine textural details or other fine details in the image, the fusion of the most significant bits with the least significant bits of the data values in the raw image data can help to restore these fine image details into the converted image data. In addition, this fusion process may be achieved on-device (such as on an end user's device) without requiring transmission of the image data to an external destination for processing.

Note that while the following discussion may often describe the fusion techniques of this disclosure in terms of converting raw image data into RGB image data, the fusion techniques here may be used in any other suitable conversion process or other process. For example, the fusion techniques here may be used to convert raw image data into any suitable color space or other image data domain. Thus, references to RGB image data below are for illustration only and can easily change depending on the implementation. Also, while the fusion techniques of this disclosure may often be described as being performed using a machine learning model on an end user's device, the fusion techniques of this disclosure may be performed using any other suitable device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to perform a fusion technique for combining most significant bits and least significant bits of image data, such as to convert raw image data into RGB image data or other image data for display or other use.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for performing a fusion technique for combining most significant bits and least significant bits of image data, such as to convert raw image data into RGB image data or other image data for display or other use. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to perform a fusion technique for combining most significant bits and least significant bits of image data, such as to convert raw image data into RGB image data or other image data for display or other use.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
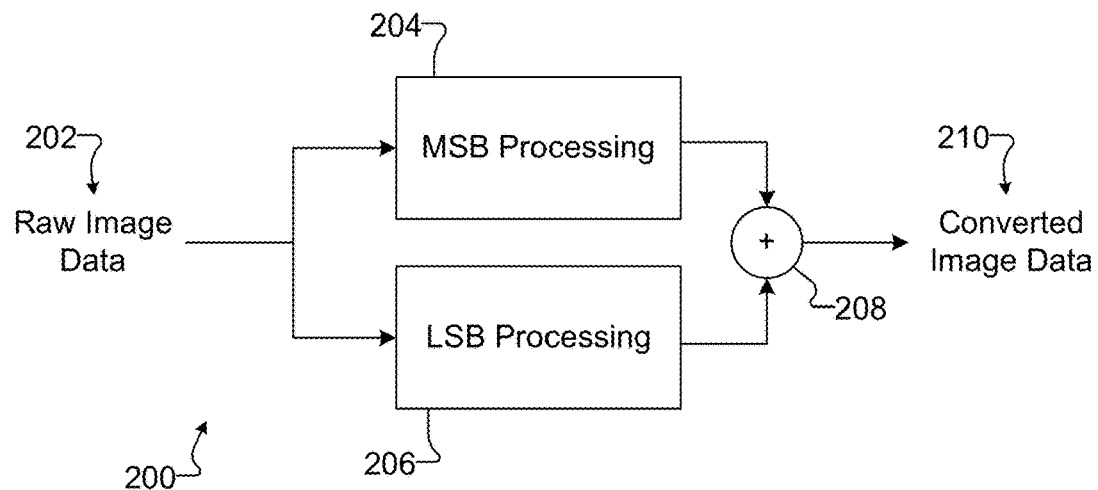
FIG. 2 illustrates an example process supporting a fusion technique for combining most significant bits and least significant bits of image data in accordance with this disclosure.

FIG. 2 illustrates an example process 200 supporting a fusion technique for combining most significant bits and least significant bits of image data in accordance with this disclosure. For ease of explanation, the process 200 shown in FIG. 2 is described as being performed by the electronic device 101 in the network configuration 100 of FIG. 1. However, the process 200 shown in FIG. 2 could be used with any other suitable device(s) and in any other suitable system(s).

As shown in FIG. 2, the process 200 is generally used to receive and process raw image data 202. The raw image data 202 may be obtained from any suitable source(s), such as when the raw image data 202 is produced by at least one camera or other imaging sensor 180 of the electronic device 101 during an image capture operation. Raw image data typically refers to image data that has undergone little if any processing after being captured. The availability of raw image data can be useful in a number of circumstances since the raw image data can be subsequently processed to achieve the creation of desired effects in output images. In many cases, for example, the raw image data 202 can have a wider dynamic range or a wider color gamut that is narrowed during image processing operations in order to produce still or video images suitable for display or other use. The raw image data 202 can represent the image data in one or more images, and each image may have any suitable resolution (such as up to hundreds of megapixels or more of image data).

Each data value in the raw image data 202 includes a specified number of total bits, and these bits include a specified number of most significant bits and a specified number of least significant bits. The total number of bits in each data value of the raw image data 202 can vary depending on the implementation and may vary based on the settings used for the image capture. In some embodiments, for example, each data value of the raw image data 202 can include ten bits. Also, the number of most significant bits and the number of least significant bits in each data value of the raw image data 202 can vary depending on the implementation and may vary based on the settings used for the image capture. In some embodiments, for instance, each data value of the raw image data 202 can include eight most significant bits and two least significant bits. Note, however, that these bit values are examples only and can vary as needed or desired.

The raw image data 202 is provided to a most significant bit (MSB) processing function 204 and a least significant bit (LSB) processing function 206. Each processing function 204 and 206 can extract desired bits from the data values of the raw image data 202 for subsequent fusion. Each processing function 204 and 206 may also optionally perform one or more desired pre-processing operations on the bits of the raw image data 202. In some embodiments, the raw image data 202 may have a RAW10 data format. This format is used to represent a collection of four image data values within five data bytes, such as in the following manner.

|        | Bit 7 | Bit 6 | Bit 5 | Bit 4 | Bit 3 | Bit 2 | Bit 1 | Bit 0 |
|--------|-------|-------|-------|-------|-------|-------|-------|-------|
| Byte 0 | P0[9] | P0[8] | P0[7] | P0[6] | P0[5] | P0[4] | P0[3] | P0[2] |
| Byte 1 | P1[9] | P1[8] | P1[7] | P1[6] | P1[5] | P1[4] | P1[3] | P1[2] |
| Byte 2 | P2[9] | P2[8] | P2[7] | P2[6] | P2[5] | P2[4] | P2[3] | P2[2] |
| Byte 3 | P3[9] | P3[8] | P3[7] | P3[6] | P3[5] | P3[4] | P3[3] | P3[2] |
| Byte 4 | P3[1] | P3[0] | P2[1] | P2[0] | P1[1] | P1[0] | P0[1] | P0[0] |

As can be seen here, this format uses each of the first four bytes to store eight of the ten bits of the four image data values. The fifth byte is used to store two of the ten bits of the four image data values. This format can be repeated using additional collections of five data bytes to store additional collections of four image data values.

In this particular example, the MSB processing function 204 can process the raw image data 202 in order to extract the most significant bits of each data value, and the LSB processing function 206 can process the raw image data 202 in order to extract the least significant bits of each data value. If eight most significant bits and two least significant bits are used for each data value in the raw image data 202, these extractions can be easily achieved since the data format already separates the most significant bits (in the first four data bytes shown above) from the least significant bits (in the last data byte shown above). However, other data formats for the raw image data 202 may be used, in which case the processing functions 204 and 206 can be used to extract the most significant bits and the least significant bits of the data values in the raw image data 202 in other ways.

A fusion function 208 is used to combine the most significant bits and the least significant bits of the raw image data 202 in order to produce converted image data 210, such as RGB image data. The fusion function 208 here can be implemented using at least one trained machine learning model, such as at least one machine learning model that includes various convolutional, deconvolutional or upsampling, and other layers for processing image data. As described in more detail below, the machine learning model can be trained to generate one or more feature maps associated with the most significant bits of the data values in the raw image data 202 for each raw image being processed. The machine learning model can also be trained to modulate the one or more feature maps based on the least significant bits of the data values in the raw image data 202 for each raw image being processed. This produces a fusion of the most significant bits and the least significant bits of the data values in the raw image data 202 for each raw image being processed, thereby generating the converted image data 210 for each raw image.

As can be seen in FIG. 2, the process 200 provides an approach where the most significant bits of the data values in the raw image data 202 and the least significant bits of the data values in the raw image data 202 can be processed separately. This allows the most and least significant bits of the data values in the raw image data 202 to be processed in appropriate manners, rather than trying to force all bits of the raw image data 202 to be processed in the same manner. Moreover, as noted above, the most significant bits of the data values in the raw image data 202 may contain many or most visual features in a raw image being processed and can be used to determine one or more feature maps of the raw image. However, the most significant bits of the data values in the raw image data 202 may lack fine textural details or other fine details in the raw image. To help compensate for this, the fusion function 208 can modulate the feature map(s) associated with the most significant bits based on the least significant bits of the data values in the raw image data 202. This helps to restore fine image details into the converted image data 210 for each raw image being processed.

Details of example implementations of the machine learning model used to perform the fusion function 208 are provided below. Note that these details are examples only and do not limit the scope of this disclosure to the specific machine learning model implementations described below. In general, any suitable machine learning model architecture or architectures may be used to implement the fusion function 208.

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor 120 of the electronic device 101, server 106, or other device(s). In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of a process 200 supporting a fusion technique for combining most significant bits and least significant bits of image data, various changes may be made to FIG. 2. For example, the converted image data 210 may be post-processed in any suitable manner prior to display or other use of the converted image data 210.

Figure 3:
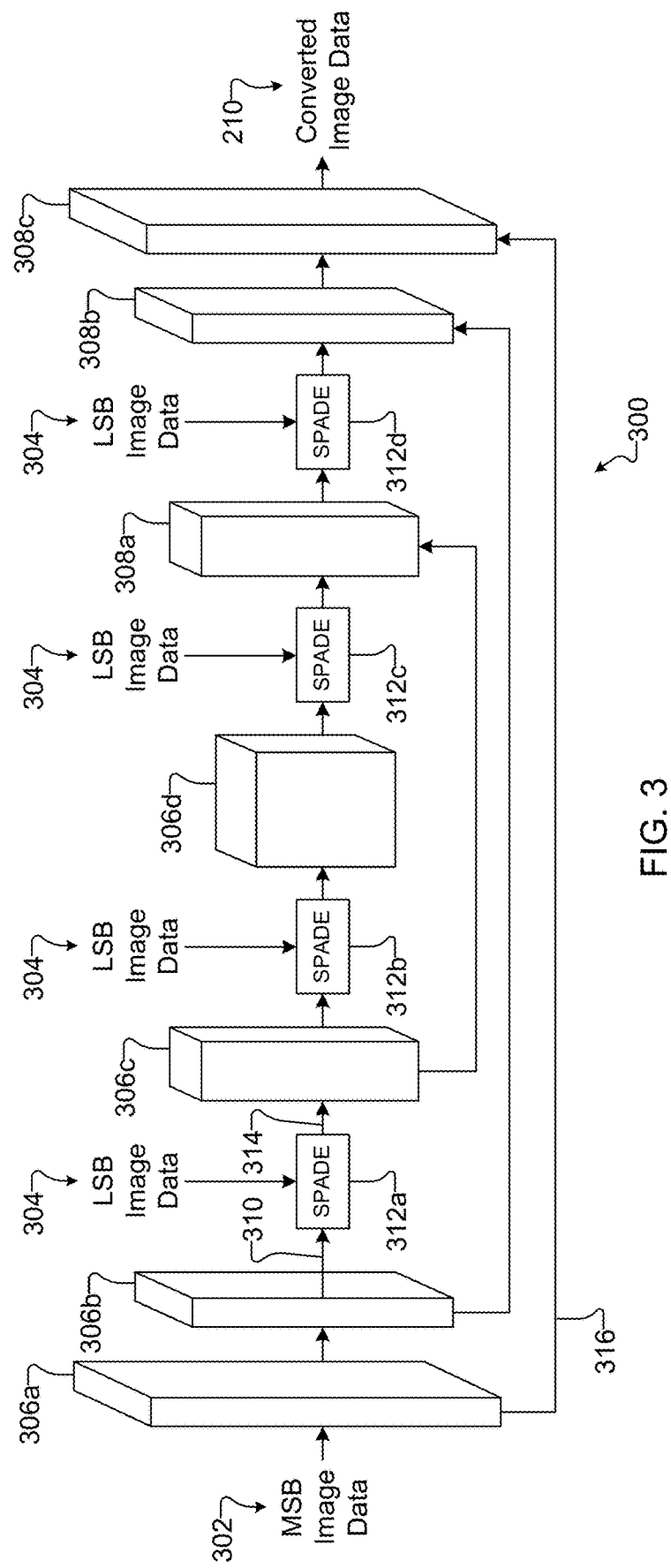
FIG. 3 illustrates an example architecture supporting a fusion technique for combining most significant bits and least significant bits of image data in accordance with this disclosure.

FIG. 3 illustrates an example architecture 300 supporting a fusion technique for combining most significant bits and least significant bits of image data in accordance with this disclosure. For example, the architecture 300 here may represent an example implementation of the fusion function 208 in the process 200 described above. For ease of explanation, the architecture 300 shown in FIG. 3 is described as being implemented on or supported by the electronic device 101 in the network configuration 100 of FIG. 1. However, the architecture 300 shown in FIG. 3 could be used with any other suitable device(s) and in any other suitable system(s).

As shown in FIG. 3, the architecture 300 receives most significant bit (MSB) image data 302 and least significant bit (LSB) image data 304. The MSB image data 302 may be provided by the MSB processing function 204, and the LSB image data 304 may be provided by the LSB processing function 206. In some cases, the MSB image data 302 may include the eight most significant bits of the data values in the raw image data 202, and the LSB image data 304 may include the two least significant bits of the data values in the raw image data 202. However, the numbers of most and least significant bits can vary depending on the implementation.

As shown in this example, the architecture 300 is implemented using a convolutional neural network (CNN) as the selected machine learning model structure. Here, the convolutional neural network is implemented using an encoder formed by a collection of convolutional layers 306a-306d and a decoder formed by a collection of deconvolutional or upsampling layers 308a-308c. Each convolutional layer 306a-306d applies a convolutional function to its inputs in order to generate its outputs. A convolutional layer 306a-306d generally represents a layer of convolutional neurons, which apply a convolutional function that emulates the response of individual neurons to visual stimuli. Each neuron typically applies some function to its input values (often by weighting different input values differently) to generate output values. Each convolutional layer 306a-306d may be associated with an activation function, which can apply a specific function or operation to the output values from the neurons to produce final outputs of the convolutional layer. In this example, the first convolutional layer 306a receives and processes the MSB image data 302 to produce an initial feature map 310, which identifies features of the MSB image data 302. Each of the remaining convolutional layers 306b-306d receives and processes the feature map 310 or a modified version of the feature map 310 from the prior convolutional layer 306a-306c. The output of the last convolutional layer 306d represents a final encoded feature map, which encodes the features the MSB image data 302.

The final encoded feature map or a modified version thereof is processed using the collection of deconvolutional or upsampling layers 308a-308c. Each deconvolutional or upsampling layer 308a-308c applies a deconvolutional or upsampling function to its inputs in order to generate its outputs. In this example, the first deconvolutional or upsampling layer 308a receives and processes the final encoded feature map encoding the MSB image data 302 provided by the convolutional layer 306d or a modified version thereof. Each of the remaining deconvolutional or upsampling layers 308b-308c receives and processes the outputs from the prior deconvolutional or upsampling layer 308a-308b or a modified version thereof. The outputs of the last deconvolutional or upsampling layer 308c represent the converted image data 210 for each raw image represented by the raw image data 202.

As described above, if only the MSB image data 302 is used in the conversion process, the converted image data 210 would lose fine image details contained in the raw image data 202. To help compensate for this, the architecture 300 here includes multiple spatially-adaptive denormalization (SPADE) functions 312a-312d. Each SPADE function 312a-312d can receive a feature map 310 and the LSB image data 304 as inputs, and the SPADE function 312a-312d modulates the feature map 310 based on the LSB image data 304. As a result, each SPADE function 312a-312d can be used to denormalize the batch-normalized convolutional features of the associated feature map 310. Effectively, the SPADE functions 312a-312d are fusing the LSB image data 304 with the features of the MSB image data 302, which helps to restore finer image details in the features of the MSB image data 302. The outputs of each SPADE function 312a-312d represent a fused feature map, which can be provided to the next convolutional or deconvolutional layer.

As can be seen in this example, in some embodiments, the SPADE functions 312a-312d can be included in or used with higher levels of the encoder (defined by later convolutional layers in the encoder) and included in or used with lower levels of the decoder (defined by earlier deconvolutional or upsampling layers in the decoder). Note that the number and positions of the SPADE functions 312a-312d can vary depending on the implementation. One example implementation of the SPADE functions 312a-312d is described below with respect to FIGS. 4 and 5. Also note that the same LSB image data 304 may be used by the various SPADE functions 312a-312d to help ensure that finer image details are restored after different convolutional and deconvolutional or upsampling operations.

In this example, one or more skip connections 316 may optionally be used to provide outputs from one or more of the convolutional layers 306a-306c to one or more corresponding deconvolutional or upsampling layers 308a-308c. Each skip connection 316 permits the feature maps 310 generated by a convolutional layer 306a-306c to be provided directly to a corresponding deconvolutional or upsampling layer 308a-308c without passing through any intermediate convolutional or deconvolutional/upsampling layers. This may help to facilitate improved information flow in the architecture 300 and allow the deconvolutional or upsampling layers 308a-308c to combine lower-resolution and higher-resolution feature maps when performing the deconvolution or upsampling operations.

It should be noted that the functions shown in or described with respect to FIG. 3 can be implemented in an electronic device 101, server 106, or other device(s) in any suitable manner. For example, in some embodiments, at least some of the functions shown in or described with respect to FIG. 3 can be implemented or supported using one or more software applications or other software instructions that are executed by the processor 120 of the electronic device 101, server 106, or other device(s). In other embodiments, at least some of the functions shown in or described with respect to FIG. 3 can be implemented or supported using dedicated hardware components. In general, the functions shown in or described with respect to FIG. 3 can be performed using any suitable hardware or any suitable combination of hardware and software/firmware instructions.

Although FIG. 3 illustrates one example of an architecture 300 supporting a fusion technique for combining most significant bits and least significant bits of image data, various changes may be made to FIG. 3. For example, various components and functions in FIG. 3 may be combined, further subdivided, replicated, or rearranged according to particular needs. Also, one or more additional components and functions may be included if needed or desired. As a particular example, more or fewer convolutional and deconvolutional or upsampling layers may be used in the architecture 300, and more or fewer SPADE functions may be used in the architecture 300.

Figure 4:
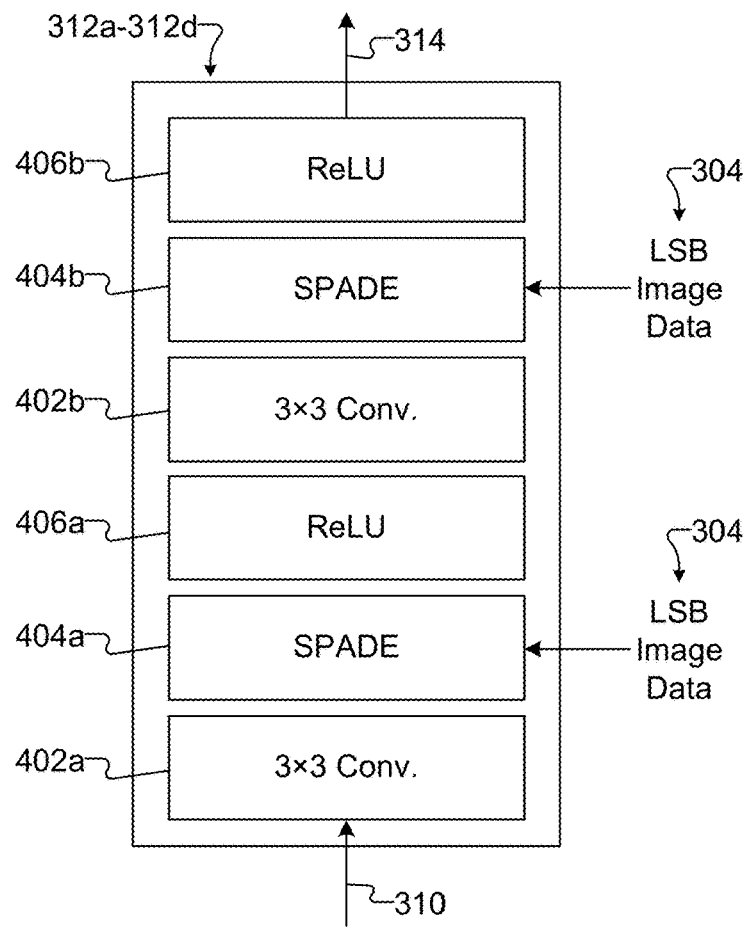
FIGS. 4 and 5 illustrate an example spatially-adaptive denormalization (SPADE) function in the architecture of FIG. 3 in accordance with this disclosure.
Figure 5:
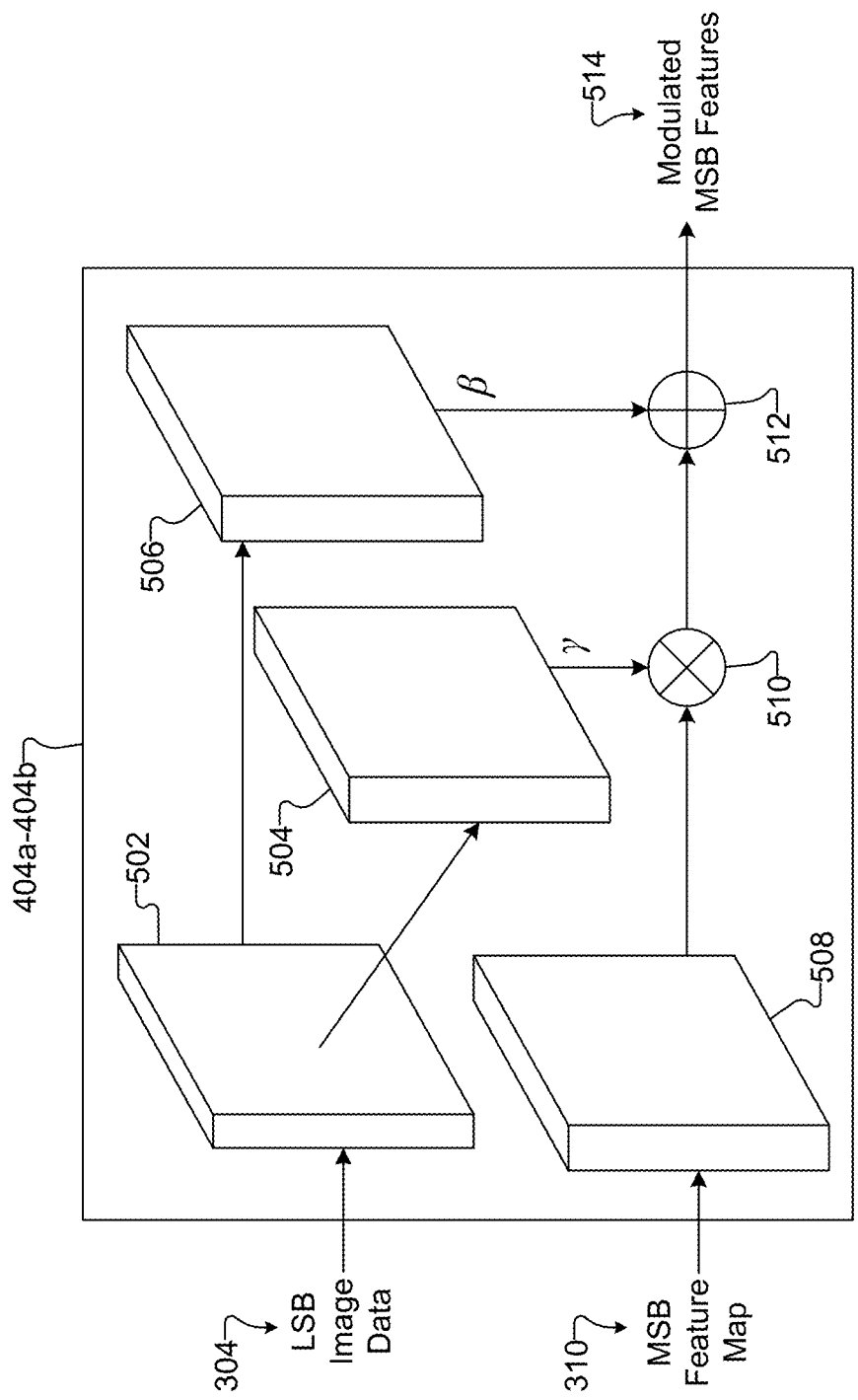

FIGS. 4 and 5 illustrate an example SPADE function 312a-312d in the architecture 300 of FIG. 3 in accordance with this disclosure. As shown in FIG. 4, the SPADE function 312a-312d includes two convolutional layers 402a-402b, two SPADE layers 404a-404b, and two rectified linear unit (ReLU) activation layers 406a-406b. Each convolutional layer 402a-402b generally operates to apply a convolution to its input data, where the input data represents features associated with the MSB image data 302. In some embodiments, for example, each convolutional layer 402a-402b can apply a 3×3 convolution to its input data. Each SPADE layer 404a-404b uses the LSB image data 304 to modulate the convolved features associated with the MSB image data 302. As a result, each SPADE layer 404a-404b can output a fusion of features associated with the MSB image data 302 and the LSB image data 304. Each of the ReLU activation layers 406a-406b generally operates to ensure that none of its outputs is negative, such as by selecting (for each input data value) the greater of that value or zero.

As shown in FIG. 5, each SPADE layer 404a-404b includes convolutional layers 502, 504, and 506. The convolutional layer 502 can apply an initial convolution to the LSB image data 304, and the convolutional layers 504 and 506 can apply additional convolutions to the outputs of the convolutional layer 502. The convolutional layer 504 here generates an output parameter γ, and the convolutional layer 506 here generates an output parameter β. As described below, the parameter γ is used to scale feature values associated with the MSB image data 302, and the parameter β is used to shift the feature values associated with the MSB image data 302. Both parameters γ and β here are based on and determined using the LSB image data 304.

In this example, a feature map 310 representing features of the MSB image data 302 (as produced by one of the convolutional or deconvolutional/upsampling layers) is provided to a convolutional layer 508. The convolutional layer 508 generally applies a batch normalization to the feature map 310, which can center and re-scale the values of the feature map 310. The batch-normalized version of the feature map 310 is provided to a multiplier 510, which multiplies the feature values in the batch-normalized version of the feature map 310 by the parameter γ. This re-scales the feature values in the batch-normalized version of the feature map 310 based on the LSB image data 304. The re-scaled batch-normalized version of the feature map 310 produced by the multiplier 510 is provided to an adder 512, which adds the parameter β to the feature values in the re-scaled batch-normalized version of the feature map 310. This shifts the feature values in the re-scaled batch-normalized version of the feature map 310 based on the LSB image data 304 and produces modulated MSB features 514. The modulated MSB features 514 represent the features of the feature map 310 after modulation is performed based on the LSB image data 304.

Various components of the architecture 300 shown in FIG. 3 (including each instance of the SPADE function 312*a*-312*d* shown in FIGS. 4 and 5) can be trained in any suitable manner. For example, in some cases, training data and ground truth data can be obtained. The training data may include raw image data 202, and the ground truth data may include converted image data 210 representing the raw image data 202 after conversion (such as after conversion from the raw image domain to the RGB image domain). As a particular example, the ground truth data may be generated based on the training data using one or more conventional or customized raw-to-RGB conversion algorithms, such as one or more raw-to-RGB conversion algorithms that generally operate more slowly or that require more processing or memory resources than typically available on end-user devices. The training data can be provided to the architecture 300, and the architecture 300 can be used to produce converted image data 210 based on the training data. The converted image data 210 can be compared to the ground truth data, and differences or errors between the converted image data 210 and the ground truth data can be identified and used to calculate an overall error or loss for the architecture 300. If the calculated loss exceeds a threshold, parameters of one or more layers in the architecture 300 (such as convolutional or deconvolutional/upsampling layers, including those in the SPADE functions 312*a*-312*d*) can be adjusted, and the training data can be processed again or new training data can be processed using the updated architecture 300. This produces new converted image data 210, which can be compared to ground truth data in order to calculate an updated loss. Ideally, the calculated loss decreases over time and eventually falls below the threshold, indicating that the architecture 300 has been trained to accurately (at least to within the desired accuracy represented by the threshold) generate converted image data 210 based on raw image data 202. In some embodiments, the loss function used to train the architecture 300 can represent a combination of an LI loss and a structural similarity (SSIM) loss.

Although FIGS. 4 and 5 illustrate one example of a SPADE function 312*a*-312*d* in the architecture 300 of FIG. 3, various changes may be made to FIGS. 4 and 5. For example, various components and functions in FIGS. 4 and 5 may be combined, further subdivided, replicated, or rearranged according to particular needs. Also, one or more additional components and functions may be included if needed or desired. As a particular example, more or fewer convolutional layers may be used in the SPADE function 312*a*-312*d*. In addition, the use of 3×3 convolutional layers 402*a*-402*b* and ReLU activation layers 406*a*-406*b* are examples of how certain operations in the SPADE function 312*a*-312*d* may be implemented, but these operations may be implemented in any other suitable manner (including those with different convolution kernel sizes or activation functions).

Figure 6:
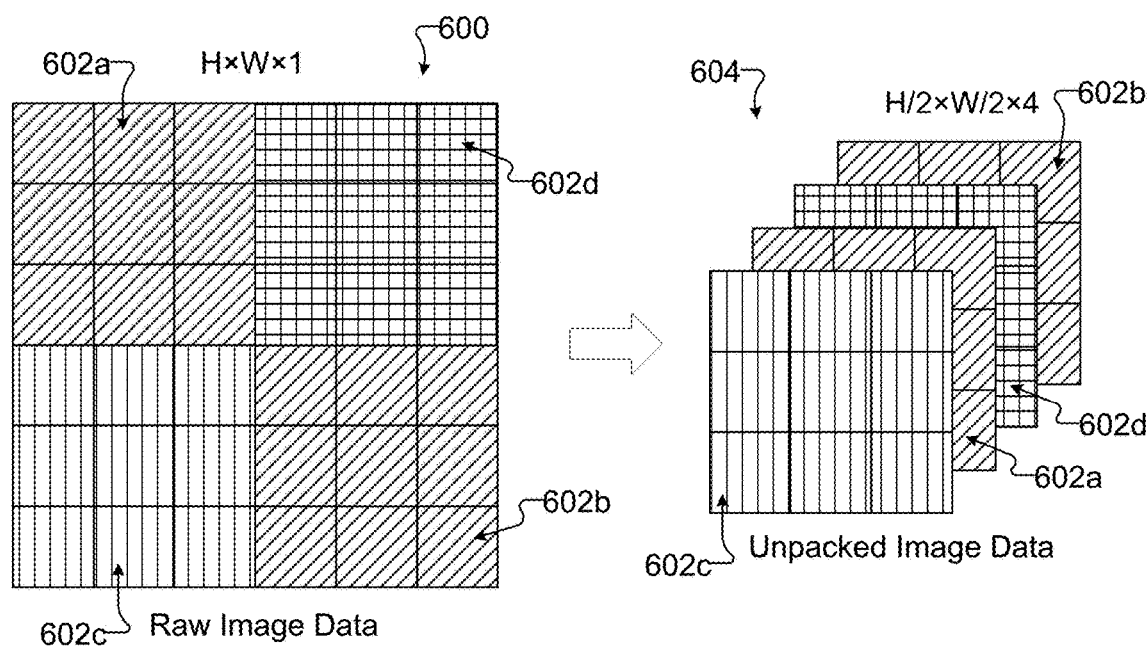
FIG. 6 illustrates an example separation of raw image data into color channels for processing using the architecture of FIG. 3 in accordance with this disclosure.

FIG. 6 illustrates an example separation of raw image data 600 into color channels for processing using the architecture 300 of FIG. 3 in accordance with this disclosure. In some cases, the raw image data 600 may represent raw image data captured using an electronic device 101, such as by using one or more imaging sensors 180. In this example, the raw image data 600 can be generally divided into four groups 602*a*-602*d* of image data, where each group 602*a*-602*d* is associated with a single primary color. For example, in some embodiments, the raw image data 600 may be captured using a Bayer color filter array, and the raw image data 600 can include green groups 602*a*-602*b*, a blue group 602*c*, and a red group 602*d*. A Bayer color filter array can be used with at least one imaging sensor 180 to produce approximately twice as many green pixel values as red or blue pixel values, which corresponds more closely to the actual physiology of the human eye. Note, however, that other types of color filter arrays may optionally be used with the architecture 300. The raw image data 600 here is said to have dimensions of H×W×1, where H refers to the height of the raw image data 600 in pixels, W refers to the width of the raw image data 600 in pixels, and 1 refers to the depth of the raw image data 600.

In this example, the raw image data 600 can be unpacked by splitting the raw image data 600 into multiple color channels 604. Each color channel 604 here is associated with a portion of the data values from the raw image data 600, namely the data values in one group 602*a*-602*d*. The color channels 604 here are said to collectively have dimensions of H/2×W/2×4, which means each of four color channels 604 has a quarter of the data values from the raw image data 600. Note that this can be done for both the most significant bits and the least significant bits of the data values in the raw image data 600.

The data values in each color channel 604 may be provided to the architecture 300 for independent processing, and the resulting data produced by the architecture 300 can be combined to produce a final output image. For example, each color channel 604 containing most significant bits of data values in the raw image data 600 can be used to generate one or more feature maps 310, and the one or more feature maps 310 can be modulated using the color channel 604 containing corresponding least significant bits of the data values in the raw image data 600. One potential advantage of splitting the raw image data 600 like this or in some other suitable manner is that the splitting can reduce the runtime memory needed by the architecture 300 significantly, since the spatial size of the raw image data being processed by the architecture 300 has been cut by four. As noted above, other approaches unpack raw image data by increasing the number of bits for each data value, which increases runtime memory requirements significantly.

Although FIG. 6 illustrates one example of a separation of raw image data 600 into color channels 604 for processing using the architecture 300 of FIG. 3, various changes may be made to FIG. 6. For example, the raw image data 600 may be split in any other suitable manner. Also, splitting of the raw image data 600 is optional and need not occur in all implementations of the architecture 300.

Figure 7A:
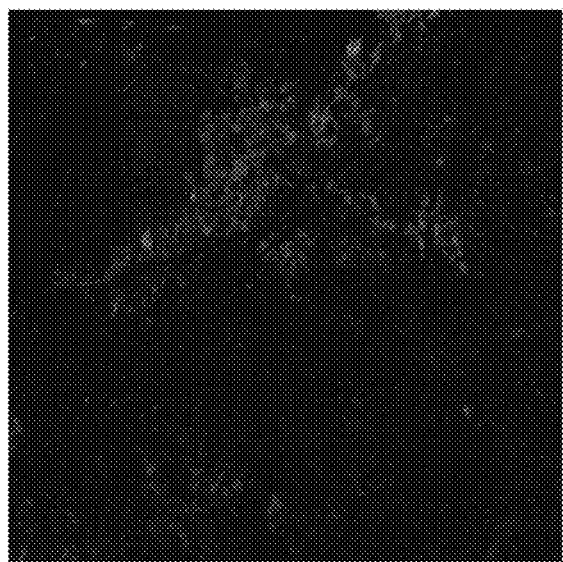
FIGS. 7A and 7B illustrate example results that may be obtained using a fusion technique for combining most significant bits and least significant bits of image data in accordance with this disclosure.
Figure 7B:

FIGS. 7A and 7B illustrate example results that may be obtained using a fusion technique for combining most significant bits and least significant bits of image data in accordance with this disclosure. More specifically, FIGS. 7A and 7B illustrate example results that may be obtained using the architecture 300 of FIG. 3. Note, however, that the architecture 300 may be used in any other suitable manner.

As shown in FIG. 7A, an image 702 represents an image formed using the most significant bits of data values in a raw data image. As shown in FIG. 7B, an image 704 represents an image formed based on the same most significant bits of the data values in the raw data image, but the most significant bits of the data values have also been modulated using the least significant bits of the data values in the raw data image. As can be seen here, many of the finer details lost using only the most significant bits of the data values have been restored by modulating the most significant bits of the data values based on the least significant bits of the data values. The resulting image 704 shown in FIG. 7B is easily suitable for display or other use. Moreover, the resulting image 704 shown in FIG. 7B can be generated in faster time and using fewer processing or memory resources compared to prior raw-to-RGB conversion techniques.

Although FIGS. 7A and 7B illustrate one example of results that may be obtained using a fusion technique for combining most significant bits and least significant bits of image data, various changes may be made to FIGS. 7A and 7B. For example, the actual contents of raw image data can vary widely, and FIGS. 7A and 7B do not limit the scope of this disclosure to any particular type of image contents. In general, raw-to-RGB conversion or other conversion can be performed with any suitable image data related to any suitable scenes being imaged.

Figure 8:
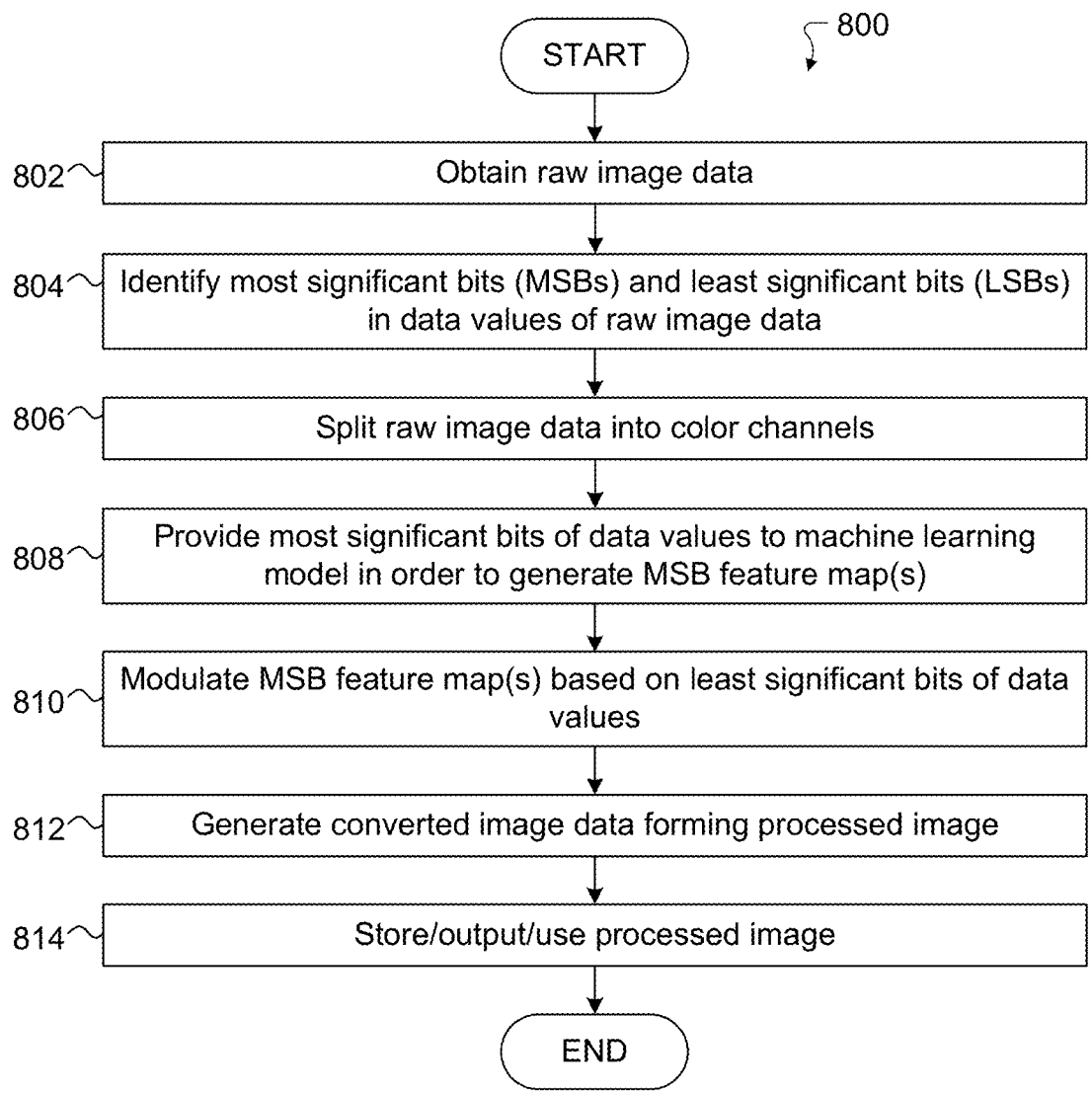
FIG. 8 illustrates an example method for combining most significant bits and least significant bits of image data in accordance with this disclosure.

FIG. 8 illustrates an example method 800 for combining most significant bits and least significant bits of image data in accordance with this disclosure. For ease of explanation, the method 800 shown in FIG. 8 is described as being performed by the electronic device 101 in the network configuration 100 of FIG. 1, where the electronic device 101 can implement the architecture 300 shown in FIG. 3 and perform the process 200 shown in FIG. 2. However, the method 800 shown in FIG. 8 could be performed by any other suitable device(s) and in any other suitable system(s).

As shown in FIG. 8, raw image data is obtained at step 802. This may include, for example, the processor 120 of the electronic device 101 obtaining raw image data 202 using one or more imaging sensors 180. The raw image data 202 includes data values, and each data value has most significant bits and least significant bits. In some cases, each data value may have eight most significant bits and two least significant bits. The most significant bits and the least significant bits of the data values in the raw image data are identified at step 804. This may include, for example, the processor 120 of the electronic device 101 performing the MSB processing function 204 and the LSB processing function 206 to extract the most significant bits and the least significant bits of the data values in the raw image data 202. The raw image data may optionally be split into multiple color channels at step 806. This may include, for example, the processor 120 of the electronic device 101 unpacking the raw image data 202 to generate multiple color channels 604. This can be done to create multiple color channels 604 for the most significant bits of the data values in the raw image data 202 and multiple color channels 604 for the least significant bits of the data values in the raw image data 202. In the following discussion, it is assumed that splitting has not occurred. However, if splitting has occurred, the following steps may be performed for data in different color channels, and the results associated with the different color channels can be combined.

The most significant bits of the data values in the raw image data are provided to a machine learning model to generate one or more MSB feature maps at step 808. This may include, for example, the processor 120 of the electronic device 101 providing the most significant bits of the data values in the raw image data 202 to the fusion function 208, which in some cases may be implemented using a convolutional neural network having the architecture 300 as shown in FIG. 3. The architecture 300 can use various layers to generate one or more feature maps 310 based on the most significant bits of the data values in the raw image data 202. The one or more MSB feature maps are modulated based on the least significant bits of the data values in the raw image data at step 810. This may include, for example, the processor 120 of the electronic device 101 performing one or more SPADE functions 312a-312d, each of which can generate parameters γ and β based on the least significant bits of the data values in the raw image data 202 and use these parameters to modulate features associated with the most significant bits of the data values in the raw image data 202. Note that any suitable number of feature maps 310 may be generated and modulated here.

The machine learning model generates converted image data representing a processed image at step 812. This may include, for example, the processor 120 of the electronic device 101 using a final layer of the architecture 300 to generate converted image data 210. The converted image data 210 can represent the raw image data 202 as converted into a different domain, such as the RGB domain. The processed image can be stored, output, or used in some manner at step 814. This may include, for example, the processor 120 of the electronic device 101 causing the converted image data 210 to be displayed on the display 160 of the electronic device 101, saved to a camera roll stored in a memory 130 of the electronic device 101, or attached to a text message, email, or other communication to be transmitted from the electronic device 101. Of course, the processed image could be used in any other or additional manner.

Although FIG. 8 illustrates one example of a method 800 for combining most significant bits and least significant bits of image data, various changes may be made to FIG. 8. For example, while shown as a series of steps, various steps in FIG. 8 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining raw image data, the raw image data comprising data values each having most significant bits and least significant bits;
providing the raw image data to a trained machine learning model;
generating processed image data using the trained machine learning model; and
presenting an image based on the processed image data;
wherein the trained machine learning model is trained to modulate a feature map associated with the most significant bits of the data values of the raw image data based on the least significant bits of the data values of the raw image data in order to generate a fusion of the most significant bits and the least significant bits of the data values of the raw image data; and
wherein the trained machine learning model is configured to perform spatially-adaptive denormalization in order to modulate the feature map associated with the most significant bits of the data values of the raw image data based on the least significant bits of the data values of the raw image data.

2. The method of claim 1, wherein the trained machine learning model comprises one or more convolutional layers configured to receive the least significant bits of the data values of the raw image data and generate one or more parameters used to modulate the feature map associated with the most significant bits of the data values of the raw image data.

3. The method of claim 1, wherein the spatially-adaptive denormalization denormalizes batch-normalized convolutional features of the feature map associated with the most significant bits of the data values of the raw image data.

4. The method of claim 1, wherein:
the trained machine learning model comprises convolutional and deconvolutional or upsampling layers configured to generate multiple feature maps associated with the most significant bits of the data values of the raw image data; and
the trained machine learning model further comprises at least one set of additional convolutional layers configured to receive the least significant bits of the data values of the raw image data and determine one or more parameters used to modulate the feature maps.

5. The method of claim 1, further comprising:
splitting the raw image data into multiple color channels to form multiple color channels for the most significant bits and multiple color channels for the least significant bits;
wherein the trained machine learning model is trained to modulate feature maps associated with the multiple color channels for the most significant bits based on the multiple color channels for the least significant bits.

6. The method of claim 1, wherein the processed image data comprises red-green-blue (RGB) image data.

7. The method of claim 1, wherein each data value of the raw image data comprises eight most significant bits and two least significant bits.

8. An apparatus comprising:
at least one imaging sensor; and
at least one processing device configured to:
obtain raw image data using the at least one imaging sensor, the raw image data comprising data values each having most significant bits and least significant bits;
provide the raw image data to a trained machine learning model;
generate processed image data using the trained machine learning model; and
initiate presentation of an image based on the processed image data;
wherein the trained machine learning model is trained to modulate multiple feature maps associated with the most significant bits of the data values of the raw image data based on the least significant bits of the data values of the raw image data in order to generate a fusion of the most significant bits and the least significant bits of the data values of the raw image data;
wherein the trained machine learning model comprises convolutional and deconvolutional or upsampling layers configured to generate the multiple feature maps associated with the most significant bits of the data values of the raw image data; and
wherein the trained machine learning model further comprises at least one set of additional convolutional layers configured to receive the least significant bits of the data values of the raw image data and determine one or more parameters used to modulate the feature maps.

9. The apparatus of claim 8, wherein the trained machine learning model comprises one or more convolutional layers configured to receive the least significant bits of the data values of the raw image data and generate one or more parameters used to modulate the feature maps associated with the most significant bits of the data values of the raw image data.

10. The apparatus of claim 8, wherein the trained machine learning model is configured to perform spatially-adaptive denormalization in order to modulate the feature maps associated with the most significant bits of the data values of the raw image data based on the least significant bits of the data values of the raw image data.

11. The apparatus of claim 10, wherein the spatially-adaptive denormalization denormalizes batch-normalized convolutional features of the feature maps associated with the most significant bits of the data values of the raw image data.

12. The apparatus of claim 8, wherein:
the at least one processing device is further configured to split the raw image data into multiple color channels to form multiple color channels for the most significant bits and multiple color channels for the least significant bits; and
the trained machine learning model is trained to modulate feature maps associated with the multiple color channels for the most significant bits based on the multiple color channels for the least significant bits.

13. The apparatus of claim 8, wherein the processed image data comprises red-green-blue (RGB) image data.

14. The apparatus of claim 8, wherein each data value of the raw image data comprises eight most significant bits and two least significant bits.

15. A non-transitory machine readable medium containing instructions that when executed cause at least one processor to:
obtain raw image data, the raw image data comprising data values each having most significant bits and least significant bits;
provide the raw image data to a trained machine learning model;
generate processed image data using the trained machine learning model; and initiate presentation of an image based on the processed image data;
wherein the trained machine learning model is trained to modulate a feature map associated with the most significant bits of the data values of the raw image data based on the least significant bits of the data values of the raw image data in order to generate a fusion of the most significant bits and the least significant bits of the data values of the raw image data; and
wherein the trained machine learning model is configured to perform spatially-adaptive denormalization in order to modulate the feature map associated with the most significant bits of the data values of the raw image data based on the least significant bits of the data values of the raw image data.

16. The non-transitory machine readable medium of claim 15, wherein the trained machine learning model comprises one or more convolutional layers configured to receive the least significant bits of the data values of the raw image data and generate one or more parameters used to modulate the feature map associated with the most significant bits of the data values of the raw image data.

17. The non-transitory machine readable medium of claim 15, wherein the spatially-adaptive denormalization denormalizes batch-normalized convolutional features of the feature map associated with the most significant bits of the data values of the raw image data.

18. The non-transitory machine readable medium of claim 15, wherein:
the trained machine learning model comprises convolutional and deconvolutional or upsampling layers configured to generate multiple feature maps associated with the most significant bits of the data values of the raw image data; and
the trained machine learning model further comprises at least one set of additional convolutional layers configured to receive the least significant bits of the data values of the raw image data and determine one or more parameters used to modulate the feature maps.

19. The non-transitory machine readable medium of claim 15, further containing instructions that when executed cause the at least one processor to split the raw image data into multiple color channels to form multiple color channels for the most significant bits and multiple color channels for the least significant bits;
wherein the trained machine learning model is trained to modulate feature maps associated with the multiple color channels for the most significant bits based on the multiple color channels for the least significant bits.

20. The non-transitory machine readable medium of claim 15, wherein:
the processed image data comprises red-green-blue (RGB) image data; and
each data value of the raw image data comprises eight most significant bits and two least significant bits.

* * * * *